(12) United States Patent
Sugita et al.

(10) Patent No.: US 7,522,792 B2
(45) Date of Patent: Apr. 21, 2009

(54) OPTICAL ELEMENT, LASER LIGHT SOURCE, AND TWO-DIMENSIONAL IMAGE FORMING APPARATUS

(75) Inventors: Tomoya Sugita, Osaka (JP); Kiminori Mizuuchi, Osaka (JP); Ken'ichi Kasazumi, Osaka (JP); Akihiro Morikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/582,341

(22) PCT Filed: Dec. 9, 2004

(86) PCT No.: PCT/JP2004/018361

§ 371 (c)(1),
(2), (4) Date: Jun. 9, 2006

(87) PCT Pub. No.: WO2005/057271

PCT Pub. Date: Jun. 23, 2005

(65) Prior Publication Data

US 2007/0140616 A1 Jun. 21, 2007

(30) Foreign Application Priority Data

Dec. 10, 2003 (JP) .............................. 2003-411442

(51) Int. Cl.
*G02B 6/26* (2006.01)
*G02B 6/42* (2006.01)
(52) U.S. Cl. .............................. 385/50; 385/32; 385/39
(58) Field of Classification Search .................. 385/32, 385/50, 133, 31, 36, 39, 129; 372/6
See application file for complete search history.

(56) References Cited

U.S. PATENT DOCUMENTS 6,324,330 B1 * 11/2001 Stites .......................... 385/133
6,741,394 B1    5/2004 Tanitsu et al.
2003/0031029 A1   2/2003 Kawaai et al.

FOREIGN PATENT DOCUMENTS

| JP | 58-48013 A | 3/1983 |
| JP | 59-180519 A | 10/1984 |
| JP | 6-51236 | 2/1994 |
| JP | 7-306304 | 11/1995 |
| JP | 07307273 A | 11/1995 |
| JP | 08111107 A | 4/1996 |
| JP | 2002-40327 | 2/2002 |
| JP | 2002-268000 A | 9/2002 |
| JP | 2003-57514 | 2/2003 |
| JP | 3410813 | 3/2003 |

* cited by examiner

*Primary Examiner*—Kevin S Wood
*Assistant Examiner*—John M Bedtelyon
(74) *Attorney, Agent, or Firm*—Steptoe & Johnson LLP

(57) ABSTRACT

An optical element (10) according to the present invention is provided with a plurality of waveguides (11)~(13) and a plurality of light path coupling parts (21), (22) coupling adjacent waveguides so as to optically couple said plural waveguides serially, wherein the paths for transmitting lights through the plural waveguides are curved at the optical path coupling parts, thereby the optical elements which is converted the incident laser light into the emitted light having uniform cross-sectional light intensity distribution can give a compact structure, further a laser light source that employs the optical element, and a two-dimensional image forming apparatus that employs the laser light source can also give a compact structure.

12 Claims, 7 Drawing Sheets

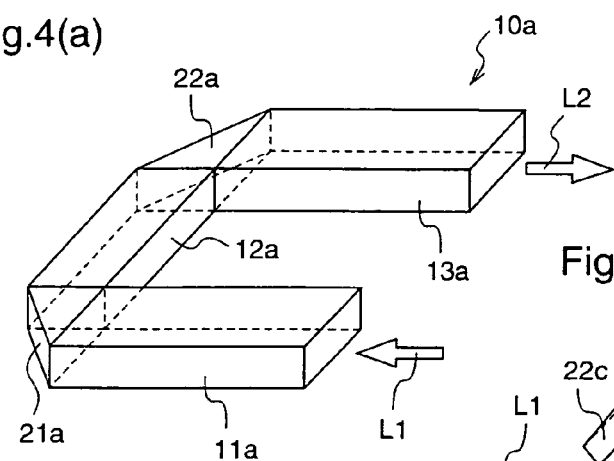
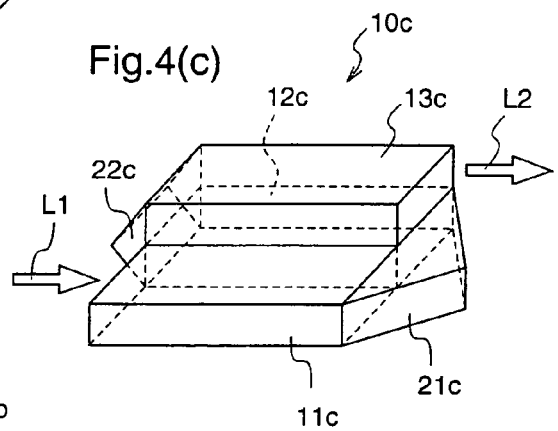
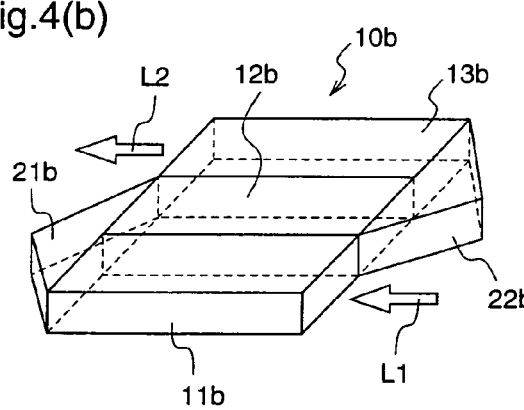
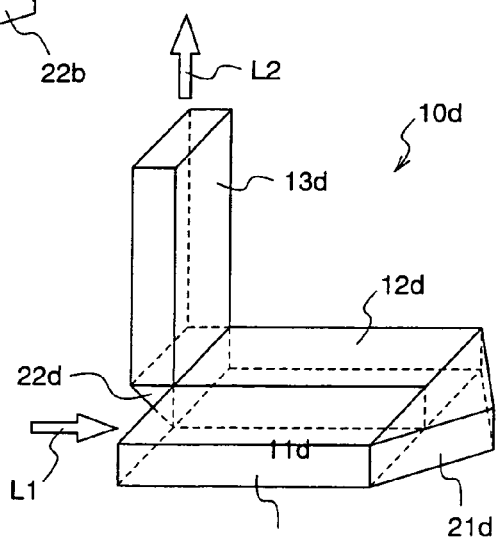

OPTICAL ELEMENT, LASER LIGHT SOURCE, AND TWO-DIMENSIONAL IMAGE FORMING APPARATUS

CLAIM OF PRIORITY

This application claims priority under 35 USC 371 to International Application No. PCT/JP2004/018361, filed on December 9, 2004, which claims priority to Japanese Patent Application No. 2003-411442, filed on December 10, 2003, each of which is incorporated by reference in its entirety.

TECHNICAL FIELD

The present invention relates to an optical element, a laser light source, and a two-dimensional image forming apparatus and, more particularly, to an optical element that converts an incident light to an emitted light that has a uniform emitted light intensity distribution, a laser light source employing the optical element, and a two-dimensional image forming apparatus employing the laser light source.

BACKGROUND ART

Up to now, the laser light source is mainly applied in the fields of measurements, optical communication, optical discs, and the like which utilize the collecting characteristics of laser light as well as high coherency. However, the research and developments of laser light sources are eminent and small-sized high output lasers represented by semiconductor lasers are advancing in their practical uses, and there are such as multi-mode semiconductor lasers which can accomplish outputs of several watts order in semiconductor lasers.

Accompanying by such miniaturizations and high outputting of such laser light sources, developments of applications using laser light sources of miniaturized and capable of high outputting and developments of apparatuses used therein are activated.

High output light sources are expected to be applied in various uses such as in picture display apparatuses, illumination apparatuses, and semiconductor exposure apparatuses, and particularly, high output laser light sources are sought to become capable of realizing a high color purity degree sharpness image in a laser display using high laser outputs of RBG three original colors utilizing its high mono-color characteristics. In addition, it is also expected to apply a miniaturized high output laser light source to an illumination light source that is of low power consumption and has a lengthy lifetime. Further, the high output laser light sources are also applied to laser processing where minute configuration processing by the high output lasers is being realized.

In the applications using such high output laser light sources, in addition to that the mono-color characteristics and high output characteristics of the laser light are utilized, there is a large request for a uniform cross-section intensity distribution, and there have conventionally methods for satisfying the same.

For example, in patent Documents No. 1 and No. 2, those which form the output lights from the laser light sources having a Gaussian light intensity distribution so as to have a uniform light intensity distribution using devices or optical systems which make the light quantity uniform and which are called as a homogenizer are disclosed. Further, in patent Documents No. 3 and No. 4, those which form the output lights from the laser light sources so as to have a uniform light intensity distribution using optical elements which are called as integrators.

Patent Document No. 1: Japanese Unexamined Patent Publication No. 07-306304
Patent Document No. 2: Japanese Patent No. 3410813
Patent Document No. 3: Japanese Unexamined Patent Publication No. 2002-40327
Patent Document No. 4: Japanese Unexamined Patent Publication No. 2003-57514

DISCLOSURE OF THE INVENTION

Problems to be Solved by the Invention

In the prior art patent references No. 1 to No. 3 as described above, since it is required to properly enlarge the cross-sectional area of the output light before the output light from the laser light source is incident to the optical element or the optical system, the optical system including the laser light source becomes complicated and the device area is increased. Further, when the output light from the laser light source is incident to the optical element after the cross-sectional area of the output light is increased, the outer circumferential part of the beam of the output light is cut out, thereby resulting in a loss on light quantity.

In the patent reference No. 4, though the cross-sectional area of the output light is not required to be broadened, in order to output the light from the laser light source with making the light intensity uniform, the length in the light transmission direction of the rod integrator has to be made long, thereby resulting in a large device area.

Further, when a laser light source having a high interference is employed as a light source, the light emitted from the optical element that has made the light quantity uniform as described above generates minute irregular noises due to minute interfering patterns specific to laser light characteristics which are called as speckle noises. As a method to remove these speckle noises, a method of vibrating a screen, a method of making the light pass through a dispersion plate to give random phases to the laser light temporarily and spatially, and the like have bee adopted. However, the method of vibrating the screen cannot fix the screen, and the method employing such as a dispersion plate resulted in reduction in the light quantity used for the video image projection as well as an increase in the device size.

The present invention is directed to solving the above-described problems and has an object to provide a compact optical element that converts the incident light to an emitted light that has a uniform output light intensity distribution, a laser light source that employs the optical element, and a two-dimensional image forming apparatus that employs the laser light source.

Measures to Solve the Problems

In order to solve the above-described problems, according to one embodiment of the present invention, an optical element comprises: a plurality of waveguides transmitting a light; a plurality of light path coupling parts coupling adjacent waveguides so as to optically couple said plural waveguides serially, and the paths for transmitting lights through the plural waveguides are curved at least one part of said optical path coupling parts.

Thereby, the incident laser light can be converted into the emitted light having uniform cross-sectional light intensity distribution by quite compact optical elements.

Such an optical element may include an odd number of waveguides are provided as said plural waveguides, and said odd number of waveguides are disposed overlapping with each other in parallel with respect to the light transmission direction of said waveguides.

Thereby, the advancing direction of the light incident to the optical element and the advancing direction of the light that is outputted from the optical element can be made the same direction, and therefore, the device structure for mounting the optical elements can be simplified.

Such an an optical element may also include external surfaces other than the light incident surface and the light output surface of the waveguide path comprising said waveguides and said light path coupling parts are coated by a reflection film reflecting the transmitting light.

Thereby, it is possible to transmit the light incident into inside the waveguide with efficiently reflecting the same.

In such an optical element said light path coupling parts may have inclined surfaces which are inclined with respect to the plain vertical to the light transmission direction and are integrated with said waveguides at either or both of said adjacent waveguides.

Thereby, it is possible to reduce a number of parts in the light path coupling parts.

Such an an optical element also may include waveguides of a hollow structure in which either of gas or liquid and Brownian particles are sealed.

Thereby, it is possible to reduce speckle noises that are generated in a laser light source having a high coherency.

In such an optical element said Brownian particles may colloid particles.

Thereby, it is possible to make appropriately random the phase of the light incident to the waveguide.

In such an optical element the distance along the light transmission path from the light incident surface to the light output surface may satisfy the following equation (1):

$$L \geq W/\tan(\sin^{-1}(\sin(\theta/2)/n)) \quad (1)$$

W: width of the waveguide
n: refractive index inside the waveguide
θ: the minimum beam spread angle possessed by the semiconductor laser.

Thereby, it is possible to produce an optical element that can convert the incident laser light to an output light having a uniform cross-sectional light intensity distribution in a size that is to the minimum within the required.

The present invention also may include a laser light source comprising a semiconductor laser and an optical element which emits the laser light which is emitted from said semiconductor laser with transmitting the same, wherein said optical element includes a plurality of waveguides transmitting light, and a plurality of light path coupling parts coupling adjacent waveguides so as to optically couple said plural waveguides serially, and the path of the light for transmitting the light through the plural waveguides are curved at said optical path coupling part.

Thereby, it is possible to provide a quite compact laser light source that outputs an output light having a uniform cross-sectional light distribution intensity.

Such an optical element may also include a convex lens or a plano-convex lens which is disposed on an optical path between the semiconductor laser and the optical element and makes the spread angle of the laser light incident to the optical element smaller than the spread angle of the laser light that is emitted from the semiconductor laser.

Thereby, it is possible to realize a light source making the cross-sectional light intensity distribution uniform which can convert the spread angle of the light emitted from the optical element to an arbitrary angle. As a result, since the spread angle of the output light from the optical element can be made small, it is possible to make the light emitted from the optical element one that is easy in being handled.

In the present invention, a laser light source may include a cylindrical lens disposed on a light path between said semiconductor laser and said optical element.

Thereby, it is possible to convert the elliptical shape light beam that is outputted from the semiconductor laser to a light beam having a circular shape that is easy to handle. Further, even when the cross-sectional configurations of the respective waveguides are designed to be in a rectangular shape having an arbitrary aspect ratio, a laser light source having an arbitrary output beam aspect ratio that can accomplish a uniform output light cross-sectional intensity distribution with a short optical path length efficiently by selecting the curvature of the cylindrical lens can be obtained, thereby the design of the configuration of the optical element is made without any inhibition.

In the laser light source the cylindrical lens may be a plano-concave lens.

Therefore, it is possible to broaden the spread angle only in one axis direction of the light that is incident to the optical element, and as a result, the entire optical length of the optical element that is required for making uniform the output light cross-sectional intensity distribution can be reduced.

And, in the laser light source the light incident surface of the optical element may be in a curved configuration having curvature.

Thereby, it is not needed to dispose a lens on an optical path between the semiconductor laser and the optical element, and therefore, a compact laser light source is obtained.

The present invention is also embodied in a two-dimensional image forming apparatus comprising: a laser light source emitting a laser light; a space optical modulation part that modulates a laser light emitted from the laser light source; and an illumination optical system for illuminating the laser light that is outputted from the laser light source to the space light modulation part, wherein said laser light source has a plurality of waveguides transmitting a light, and a plurality of light path coupling parts coupling adjacent waveguides so as to optically couple said plural waveguides serially, and the paths for transmitting lights through the plural waveguides are curved at said optical path coupling parts.

Thereby, it is possible to provide, as a laser light source used in a two-dimensional image forming apparatus, one which is quite a compact laser light source that outputs an output light having a uniform cross-sectional light distribution intensity.

The two-dimensional image forming apparatus may include a projection optical system which projects the laser light that is emitted from the space optical modulation part.

Thereby, quite a compact two-dimensional image formation system which has quite simple parts constructions can be realized.

Effects of the Invention

According to an optical element of the present invention, since the optical element comprises a plurality of waveguides transmitting a light and a plurality of light path coupling parts coupling adjacent waveguides so as to optically couple said plural waveguides serially, and the paths for transmitting lights through the plural waveguides are curved at the optical path coupling parts, thereby it is possible to make the size the optical elements quite small and to obtain the effects which can be converted into the emitted light having uniform cross-sectional light intensity distribution by the optical element.

Further, since the plural waveguides have hollow structure, and either of gas or liquid and Brownian particles are sealed in the hollow of the waveguides, it is possible to reduce speckle noise that are generated in a laser light source having a high coherency.

According to a laser light source of the present invention, since the laser light source has integrated a semiconductor laser with the optical element, and has employed lens which collects or diffuses the laser light on an optical path between the laser light source and the semiconductor laser, it is possible to convert the spread angle of the light emitted from the optical element or to broaden the spread angle only in one axis direction of the incident light so that the cross-section light intensity distribution is made uniform, whereby it is possible to obtain the laser light source having a beam shape that is easy to handle.

Further in the laser light source, by having a lens which collects or diffuses the laser light before the optical element and selecting the curvature of the lens, it is possible to realize the laser light source which can accomplish a uniform output light cross-sectional intensity distribution with a short optical path length efficiently and can have an arbitrary output beam aspect ratio, thereby it is possible to increase the degree of freedom in designing the optical element.

In addition, according to a two-dimensional image forming apparatus of the present invention, since the two-dimensional image forming apparatus employs the laser light source, it is possible to obtain a effect that quite a compact two-dimensional image formation system which has quite simple parts constructions can be realized.

BRIEF DESCRIPTION OF THE DRAWINGS

FIG. 3 is a diagram for explaining a function of the optical element according to the first embodiment, where FIG. 3(a) shows variation of the light intensity distribution in a free space of the laser light, while

FIG. 4 are diagrams illustrating other examples of combinations of waveguides in the optical element according to the first embodiment of the present invention.

Figure 1A:
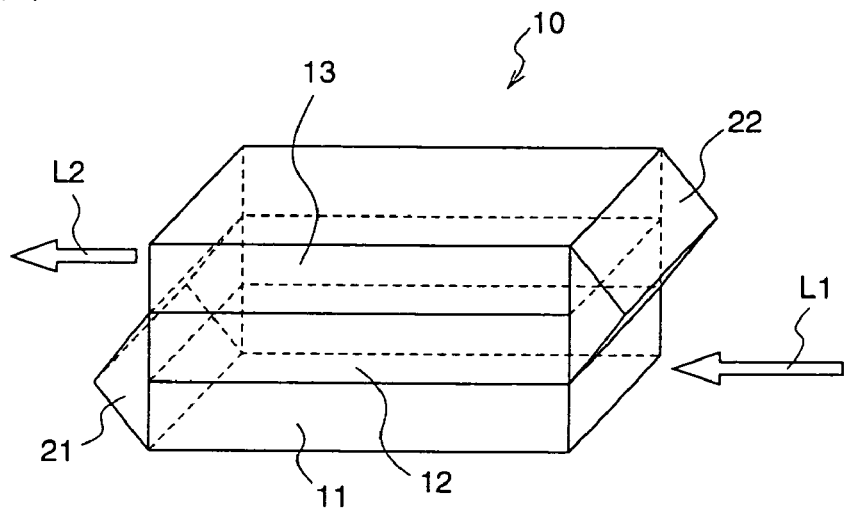
FIG. 1 are a cross-sectional view (FIG. 1(a)) and a perspective view (FIG. 1(b)) for explaining an optical element according to a first embodiment of the present invention.

DESCRIPTION OF NUMERALS 3 reflection film
10, 10a, 10b, 10c, 10d, 15, 30, 40, 50, 60 optical element
11, 11a, 11b, 11c, 11d, 12, 12a, 12b, 12c, 12d, 13, 13a, 13b, 13c, 13d, 16, 17, 18,31, 32, 33, Wg waveguide
21, 22 optical coupling parts
16a, 17a, 17b, 18b inclined surface
19a, 19b light passing regionτs
41, 51, 61, Ld semiconductor laser
52 plano-convex lens
62 cylindrical lens
70 lens
72 liquid crystal panel
81 projector lens
82 screen
140, 150, 160, 170 laser light source
200, 270 lighting system
300 two-dimensional image forming apparatus
L1, L1a, L2, L2a, L3 laser light

BEST MODE TO EXECUTE THE INVENTION

Hereinafter, embodiments of the present invention will be described with reference to the drawings.

Embodiment 1

In this first embodiment, an optical element that has made the device size quite small by using plural waveguides and light path coupling parts which optically serially couples the waveguides.

Figure 1B:
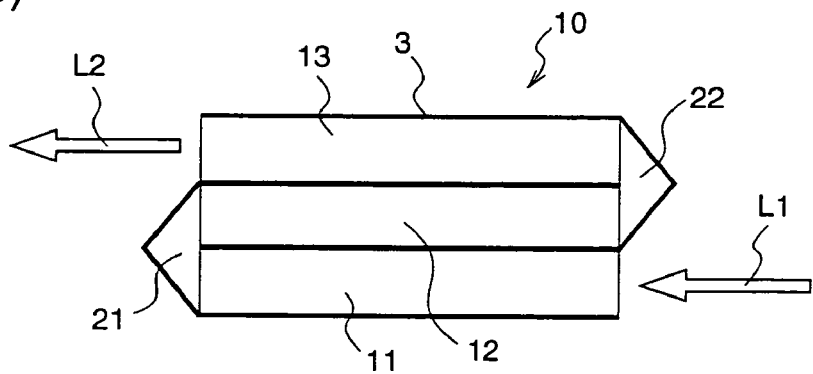

FIG. 1 are diagrams for explaining an optical element according to a first embodiment of the present invention, FIG. 1(a) shows a cross-sectional view and FIG. 1(b) shows a perspective view.

The optical element 10 shown in FIG. 1 has first to third waveguides 11 to 13 having rectangular configurations comprising glass material transmitting incident light, and optical coupling parts 21, 22 coupling the respective waveguides 11 to 13 optically serially.

In this optical element 10, second and third waveguides 12 and 13 are successively stacked on the first waveguide 11 so that the light propagation directions in theses waveguides are parallel to each other, and the first waveguide 11 and the second waveguide 12 positioned thereon, and the second waveguide 12 and the third waveguide 13 positioned thereon are adhered to each other at their respective confronting surfaces by such as adhesion, respectively.

Here, an end surface of the second waveguide 12 that is perpendicular to its light propagation direction and an end surface of the third waveguide 13 that is perpendicular to its light propagation direction are positioned in the same plain as the light emitting surface of the first waveguide 11. Further, the other end surface of the second waveguide 12 that is perpendicular to its light propagation direction and the other end surface of the third waveguide 13 that is perpendicular to its light propagation direction are positioned in the same plain as the light incident surface of the first waveguide 11.

Further, at the side of the light emitting surface of the first waveguide 11, a rectangular prism 21 serving as a light path coupling part which optically couples the first waveguide and the second waveguide, and this rectangular prism 21 is disposed straddling the end surfaces of these waveguides so that the light emitted from the light emission end surface of the first waveguide 11 is reflected thereby to be incident to the one end surface of the second waveguide 12. Further, at the side of the light incident surface of the first waveguide 11, a rectangular prism 22 serving as a light path coupling part which optically couples the second waveguide and the third waveguide, and this rectangular prism 22 is disposed straddling the end surfaces of these waveguides so that the light emitted from the side of the other surface of the second waveguide 12 is reflected thereby to be incident to the other end surface of the third waveguide 13.

Further, at the side surface and at the upper and lower end surfaces of the waveguides 11 to 13 and at the external surface of the rectangular prism, a reflection film 3 is provided so as to effectively carry out light confinement in the respective waveguides. These reflection films 3 comprise a metal film such as aluminum material.

Functions and effects will be described.

First of all, an operation of an optical element 10 according to the first embodiment will be briefly described.

When a light is incident to the light incident surface of the first waveguide 11, the incident light transmits through the first waveguide 11 and the rectangular prism 21 to be incident to the second waveguide 12. The light incident to the second waveguide 12 transmits through the waveguide 12 and the rectangular prism 22 to be incident to the third waveguide 13. The light incident to the third waveguide 13 is emitted from an end surface of the third waveguide 13.

Hereinafter, that the incident light can be converted into the output light having a uniform cross-section intensity distribution in the optical element 10 of this embodiment will be described.

For example, a case where a laser light is employed for the incident light is considered. While generally a laser light has a cross-sectional light intensity distribution of a Gaussian distribution, when the laser light is propagated through the waveguide with being subjected to multi-reflections, the reflected laser lights are mixed. Thereby, the light intensity distributions in arbitrary surfaces which are perpendicular to the light transmission directions in the waveguides 11, 12, and 13 are gradually made uniform in the plains as it becomes far from the light incident surface. Accordingly, by setting the lengths in the light transmission direction of the waveguides at appropriate values, the cross-sectional light intensity distribution of the laser light that is incident to the waveguide 11 can be made uniform at the light output end surface of the waveguide 13.

In quite general semiconductor lasers (such as AlGaAs series, AlGaInP series, or GaN series), the aspect ratio and the spread angle of the output lights are different. Accordingly, when a waveguide having a cross-section aspect ratio of approximately 1 is employed, a required waveguide distance may be short in order to make the cross-sectional intensity distribution uniform in the direction in which the spread angle of the light emitted from the semiconductor laser is larger, but the distance is required to be long in the direction in which the spread angle is smaller.

Conventionally, there is proposed a device which utilizes a rod shaped integrator waveguide as shown in patent reference No. 4 as a method of making the cross-section intensity distribution uniform, but it is required to make the rod length larger than several 10s mm in the light transmission direction in order to realize a perfect uniform cross-section light intensity distribution.

To the contrary, in the first embodiment of the present invention, first to third waveguides 11 to 13 are disposed overlapping, and these waveguides 11 to 13 are optically coupled so that the output light from the first waveguide is incident to the second waveguide and the output light from the second waveguide is incident to the third waveguide by using prisms 21 and 22. Thereby, the total of the lengths of these three waveguides 11 to 13 become the wave guiding distance of the light required to make the cross-sectional light intensity distribution uniform. Therefore, it is possible to shorten the lengths in the light transmission direction of the respective waveguides and to greatly shorten the length of the entire device.

The method for concretely determining the lengths of the waveguides will be described.

In the optical element 10 of the first embodiment, since the lengths in the light propagation direction of the waveguide is a main factor which determines the size of the device, a design which can realize an as much as possible compact optical element is required.

Figure 2:
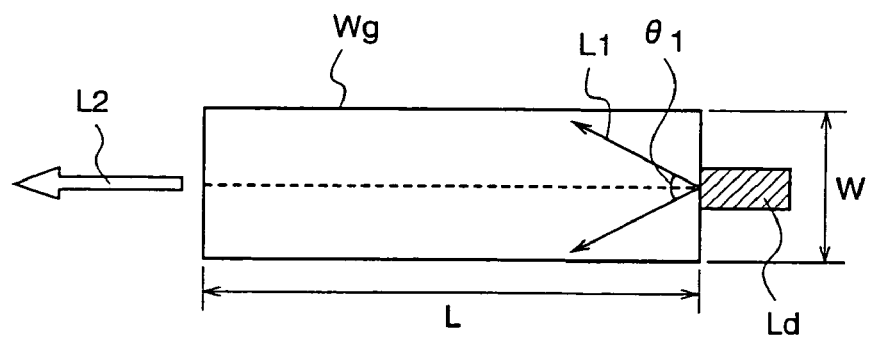
FIG. 2 is a diagram for geometrically illustrating a light transmission path of the semiconductor laser light transmitting through a simple rod shaped waveguide.

FIG. 2 shows a diagram optically and geometrically illustrating a light transmission path of the laser light which transmits through a simple rod shaped waveguide.

FIG. 2 shows a case where a single semiconductor laser is disposed adjacent the light incident surface of the waveguide so that the output light from the single semiconductor laser is incident to inside of one waveguide as a case where the size in the light transmission direction of the optical element is lengthened to the maximum.

In the figures, Ld designates a semiconductor laser, and Wg designates a waveguide comprising transparent material having a refractive index n. $\theta 1$ designates a spread angle of laser light L1 in the waveguide Wg, which is represented by a half-value entire angle of the light intensity distribution. Here, the width of waveguide Wg in spread direction of the laser light is W, and the length from the light incident surface to the light emitting end surface of the waveguide Wg, i.e., the length of the waveguide is made L.

In the arrangements of the semiconductor laser and waveguide shown in FIG. 2, the laser light L1 incident to the waveguide Wg is reflected by the side surface of the waveguide Wg. Accordingly, there can be seen a light intensity distribution that is obtained by overlapping on the light intensity distribution that is obtained by reflecting the former light intensity distribution at the side wall portion of the waveguide Wg. FIG. 3 shows a manner in which the light intensity distribution is made uniform by the reflection of the laser light at the side surface of the waveguide.

Figure 3A:
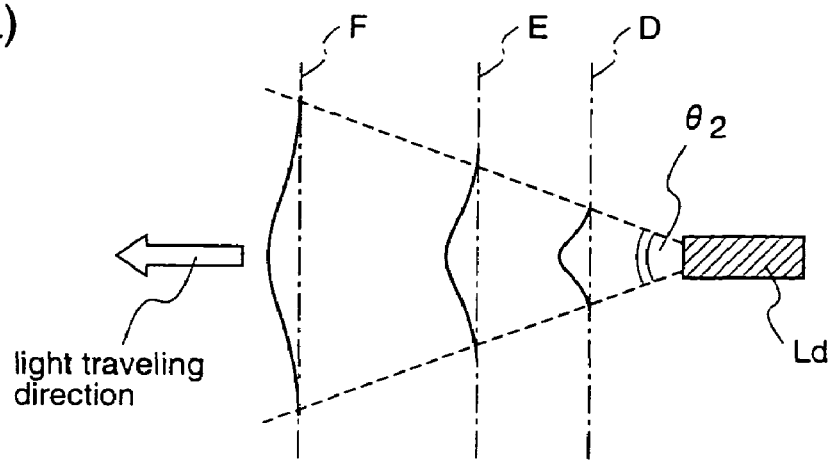
Figure 3B:
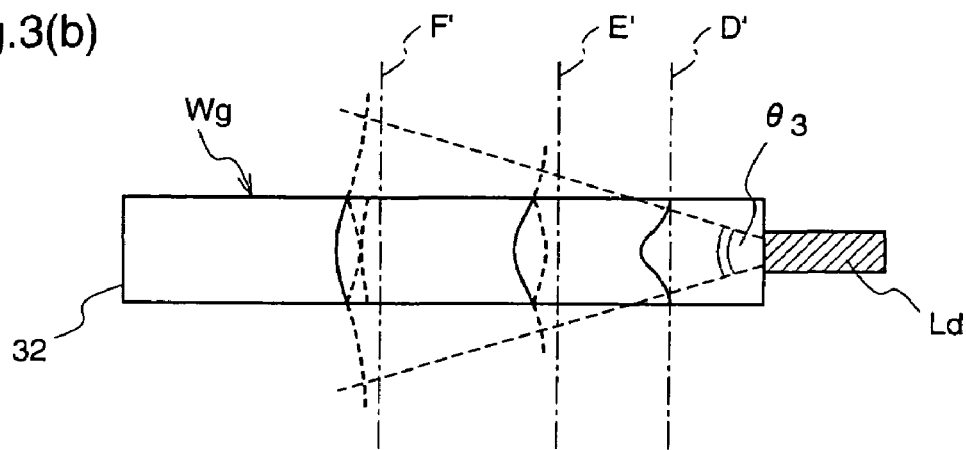
FIGS. 3(b) and 3(c) show the manner of the light intensity distribution in the waveguide being made uniform.
Figure 3C:
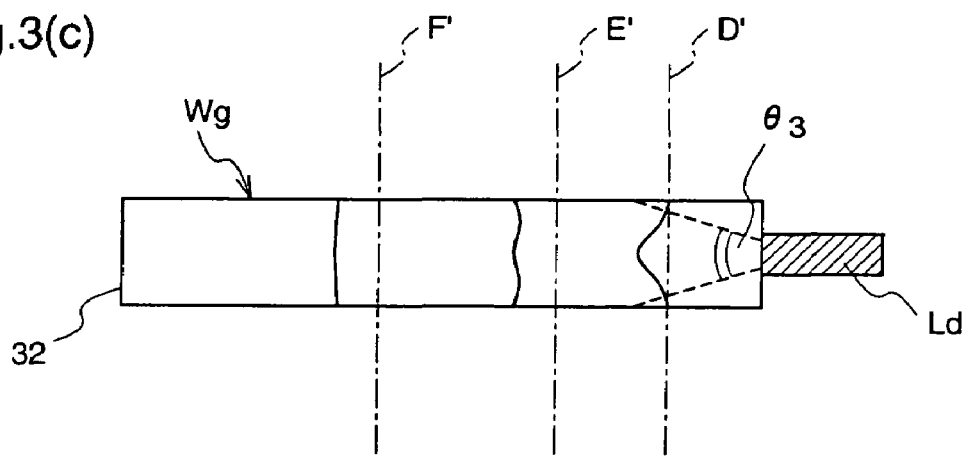

FIG. 3(a) shows a light intensity distribution in a case where the laser light transmits in a free space where there is no waveguide present, FIG. 3(b) shows a state of light intensity distributions being overlapped with each other at the side surface of the waveguide in a case where the laser light transmits in a waveguide, and FIG. 3(c) shows the light intensity distribution that is obtained by the above-described overlapping of the light intensity distribution. In FIG. 3, Ld denotes a semiconductor laser, and Wg denotes a waveguide comprising transparent material having refractive index n. Further, $\theta 2$ designates a spread angle of the semiconductor laser light in a free space, and $\theta 3$ designates a spread angle of laser light in the waveguide Wg having a refractive index n.

As shown in FIG. 3(a), the light emitted from the semiconductor laser which propagates in the free space is broadened in a spread angle $\theta 2$ with its propagation. In this way, while the spatial spreading of the light emitted from the semiconductor laser Ld increases in the free space, its intensity distribution does not change, and its cross-sectional intensity distribution keeps to maintain a Gaussian distribution type intensity distribution.

More particularly, in any of the plain D that is perpendicular to the light propagation direction in the vicinity of the semiconductor laser Ld, the plain F that is perpendicular to the light propagation direction that is apart from the semiconductor laser Ld, and the plain E that is perpendicular to the light propagation direction located between these two positions, the light intensity distribution is in a Gaussian distribution.

On the other hand, the light emitted from the semiconductor laser Ld which propagates through the waveguide Wg is totally reflected by side walls of the waveguides Wg as shown in FIGS. 3(b) and 3(c).

More particularly, the light intensity distribution of the laser light that is incident to the waveguide Wg has a Gaussian distribution in a plain D' that is perpendicular to the light propagation direction in the vicinity of the semiconductor laser Ld, while as the laser light advances along the light propagation direction from the light incident surface with repeating multiple refection of the laser lights in the waveguide, the light intensity distribution of the laser light is gradually made uniform in the cross-section (plain E' that is perpendicular to the light propagation direction) of the waveguide, and it is made uniform in a plain F' that is perpendicular to the light propagation direction that is apart from the semiconductor laser Ld.

In this case, the spread angle θ3 of the laser light thai is incident into the waveguide Wg of refractive index n becomes:

$$\theta3 = 2 \times \sin^{-1}((\sin(\theta2/2))/n)$$

Assuming the width of the waveguide Xg is W, when the incident light beam into the waveguide Wg reaches a position where the distance from the incident surface is $W/(2 \times \tan(\sin^{-1}(\sin(\theta/2)/n)))$, a part of the light intensity distribution starts to be reflected at the side surfaces of the waveguide Wg. Further, when the incident light beam exceeds this position, the intensity distribution of the light gradually increases, and until the light reaches the light emitting surface of the waveguide Wg, a light intensity distribution that is obtained by overlapping a light intensity distribution when a light propagates in a free space with one as shown FIG. 3(a) that is obtained by reflecting the light intensity distribution at a portion corresponding to the sidewall of the waveguide, is observed (FIG. 3(b)).

Then, in order that substantial light intensity distribution (FIG. 3(c)) is made sufficiently uniform, it is preferable the length of the waveguide Wg is made sufficiently long, and the number of times of total reflection is increased. However, in view of device fabrication and use, an as much as possible compact laser light source is desired.

By the examination on length of waveguide that is required to make the light intensity distribution of the laser light in the waveguide Wg, it is found that if the formula (1) in the following is satisfied, the light intensity distribution is made uniform:

$$L \geq W/\tan(\sin^{-1}(\sin(\theta1/2)/n)) \quad \text{(formula 1)}$$

θ1: a spread angle of a laser output light
n: refractive index inside the waveguide
W: width of the waveguide Accordingly, by disposing plural waveguides 11 to 13 stereoscopically overlapping to each other and serially connecting these waveguides by optical coupling parts 21 and 22, it is possible to make the size in the light propagation direction of the optical element a length that is required for making the light intensity distribution uniform, that is, a one third of the light propagation length L.

In this way, according to the optical element 10 of this first embodiment, since there are provided a plurality of waveguides which are disposed stereoscopically stacking with each other and optical path coupling parts 21,22 which optically serially couples these waveguides, it is possible to obtain an optical element which can convert the incident laser light into an emitted light having a uniform cross-sectional light intensity distribution, and having a small size in the light propagation direction.

In the above-described first embodiment, the number of stacked waveguides is three, this is not limited to three. Further, the length in the light propagation direction of the first to third waveguides 11 to 13 may be any length. In other words, in such an optical element which comprises plural waveguides which are stacked on each other as in the first embodiment, the number of lamination of waveguides and the lengths of respective waveguides can be arbitrarily determined as well as the device size can be arbitrarily varied.

Further, the advancing direction of the emitted light from the optical element can be made reverse to the advancing direction of the light incident to the optical element by setting the number of stacked waveguides an even number as well as it can be made the same as the advancing direction of the light incident to the optical element by setting the number of stacked waveguides an odd number. Therefore, it is possible to increase the degree of freedom in designing an optical element in which the light intensity distribution of the output light is made uniform.

Further, while an optical element in which plural waveguides are stacked with each other in its height direction, so that the light propagation directions in the respective waveguides are predetermined directions as in the first embodiment, the optical element may be one in which plural waveguides are overlapped with each other in its width direction or one in which plural waveguides are overlapped with each other in both of its width direction and its height direction. Further, one of the waveguides may have its light propagation direction which is different from the light propagation direction(s) of the other waveguide(s). In this case, the arrangement of waveguides in an optical element can be made one which accepts limitations on a layout in an apparatus which is provided with the optical element.

FIG. 4 shows an example that has such a stereoscopic arrangement of plural waveguides.

In FIG. 4, L1 designates an incident light incident to the waveguide, L2 designates an emitted light emitted from the waveguide.

The optical element 10a shown in FIG. 4(a) has three waveguides 11a, 12a, 13a and optical path coupling parts 21a, 22a which optically serially couples these waveguides.

In this optical element 10a, three waveguides 11a, 12a, 13a are arranged on a same plain in such a manner that the three waveguides 11a, 12a, 13a are positioned at each of the edges of a rectangular hollow three edged frame. A prism 21a which curves the light path by 90 degree is disposed between the light emitting end surface of the waveguide 11a and the light incident surface of the waveguide 12a so that these waveguides are mutually optically coupled. Further, a prism 22a which curves the light path by 90 degree is disposed between the light emitting end surface of the waveguide 12a and the light incident surface of the waveguide 13a so that these waveguides are mutually optically coupled.

The optical element 10b shown in FIG. 4(b) has three waveguides 11b, 12b, 13b and optical path coupling parts 21b, 22b which optically serially couples these waveguides, similarly as in the optical element 10 or 10a.

Here, the three waveguides 11b, 12b, 13b are arranged in their width directions, respectively, and the light emitting end surface of the waveguide 11b and the light incident surface of the waveguide 12b are positioned in the same plain, and the light emitting end surface of the waveguide 12b and the light incident surface of the waveguide 13b are positioned in the same plain. Further, a rectangular prism 21b which optically couples the waveguide 11b and the waveguide 12b is disposed straddling the light emitting end surface of the waveguide 11band the light incident side end surface of the waveguide 12b. Further, a rectangular prism 22bwhich optically couples the waveguide 12b and the waveguide 13b is disposed straddling the light emitting end surface of the waveguide 12b and the light incident side surface of the waveguide 13b.

The optical element 10c shown in FIG. 4(c) has three waveguides 11c, 12c, 13c and optical path coupling parts 21c, 22c which optically serially couples these waveguides, similarly as in the optical elements described.

Here, the waveguide 11c and the waveguide 12c are disposed adjacent to each other in their width directions. The light emitting end surface of the waveguide 11c and the light incident surface of the waveguide 12c are positioned in the same plain, and the light emitting end surface of the waveguide 12c and the light incident surface of the waveguide 13c are positioned in the same plain. Further, a rectangular prism 21c which optically couples the waveguide 11c and the waveguide 12c is disposed straddling the light emitting end surface of the waveguide 11c and the light incident side end surface of the waveguide 12c. Further, a rectangular prism 22c which optically couples the waveguide 12c and the waveguide 13c is disposed straddling the light emitting end surface of the waveguide 12c and the light incident side end surface of the waveguide 13c.

The optical element 10d shown in FIG. 4(d) has three waveguides 11d, 12d, 13d and optical path coupling parts 21d, 22d which optically serially couples these waveguides, similarly as in the optical elements described.

Here, the waveguide 11d and the waveguide 12d are disposed adjacent to each other in their width directions, and a rectangular prism 21d which optically couples the waveguide 11d and the waveguide 12d is disposed straddling the light emitting end surface of the waveguide 11d and the light incident side end surface of the waveguide 12d. Further, the waveguide 13d is disposed at the side of the light emitting end surface of the waveguide 12d so as to have a light propagation direction in the height direction of the waveguide 12d, and a prism 22d which curves the light path by 90 degree is disposed between the light emitting end surface of the waveguide 12d and the light incident surface of the waveguide 13d so as to optically couple waveguides.

While in this first embodiment, examples in which the light paths for transmitting the light through plural waveguides are curved at all the light path coupling parts are described as shown in FIG. 1 or FIG. 4, the light path may not be curved at all the light path coupling parts, but may be serially connected at each of the light path coupling parts.

While in the first embodiment the optical element was one that optically couples between waveguides using a prism, the optical element may not be limited to those in which a prism is employed to couple between waveguides.

Embodiment 2

Figure 5:
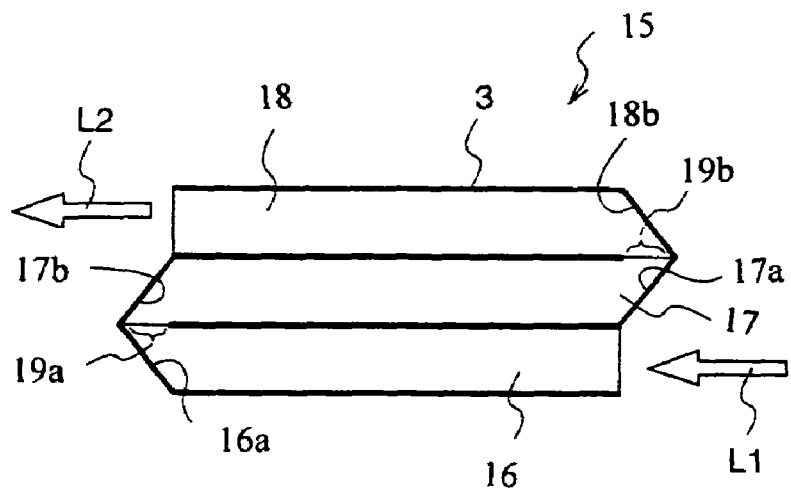
FIG. 5 is a diagram illustrating a light path coupling part in cross-section that is constituted by waveguides in an optical element according to the second embodiment of the present invention.

FIG. 5 shows an optical element according to a second embodiment of the present invention.

The optical element 15 of this second embodiment is constituted by serially coupling the respective waveguides of the optical element 10 of the first embodiment, without using a prism.

More particularly, the optical element 15 shown in FIG. 5 has a first waveguide 16 which has an end surface that is inclined by 45 degree with respect to the light propagation direction in the waveguide, a second waveguide 17 which has both end surfaces that are respectively inclined by 45 degree with respect to the light propagation direction of the waveguide, and a third waveguide 18 which has an end surface that is inclined by 45 degree with respect to the light propagation direction.

Here, the inclined surface 16a at an end side of the first waveguide 16 is a reflection plain that reflects the light propagating in the waveguide to be reflected along the waveguide height direction. The inclined surface 17b at an end side of the second waveguide 17 is a reflection plain directing downwards that reflects the light that is incident along the waveguide height direction so as to make its advancing direction be the waveguide length direction, and the inclined surface 17a at the other end side of the second waveguide 17 is a reflection plain directing upwards that reflects the light propagating in the waveguide so as to make the same emit along the waveguide height direction. The inclined surface 18b at an end side of the third waveguide 18 is a reflection plain directing downwards that reflects the light incident along the waveguide height direction so as to make its advancing direction be the waveguide length direction.

In this optical element 15, the second waveguide 17 is stacked on the first waveguide 16 so that the light propagation directions in these waveguides are parallel to each other and that the upward directing reflection plain 16a at an end side of the first waveguide 16 and the downward directing reflection plain 17b at the other end side of the second waveguide 17 confront to each other. Further, the third waveguide 18 is stacked on the second waveguide 17 so that the light propagation directions in these waveguides are parallel to each other and that the upward directing reflection plain 17a at an end side of the second waveguide 17 and the downward directing reflection plain 18b at the other end side of the third waveguide 18 confront to each other. The first waveguide 16 and the second waveguide 17 disposed thereon, and the second waveguide 17 and the third waveguide 18 disposed thereon, are respectively adhered to each other at their confronting surfaces by such as adhesion.

Here, by the upward directing reflection plain 16a of the first waveguide 16 and the downward directing reflection plain 17b of the second waveguide 17, the optical path coupling part which couples the first waveguide 16 and the second waveguide 17 is provided, and by the upward directing reflection surface 17a of the second waveguide 17 and the downward directing reflection surface 18b of the third waveguide 18 the optical path coupling part which couples the second waveguide 17 and the third waveguide 18 is provided.

Here, at the upper and lower both side surfaces of the respective waveguides 16, 17, 18 and the external surfaces of the optical coupling part, for example, a high reflection film such as a metal film comprising aluminum material is formed.

Further, at the light coupling parts which couple the upper and lower waveguides, glass material constituting the two waveguides are adhered, and these adhesion plains constitute light passing regions 19a and 19b where high reflection films are not formed.

Functions and effects will be described.

The light incident to the light incident side end surface of the first waveguide 16 propagates through the first waveguide 16 and the optical coupling part, and is incident to the second waveguide 17. The light incident to the second waveguide 17 propagates through the second waveguide 17 and the optical coupling part, and is incident to the third waveguide 18. Then, the light incident to the third waveguide 18 is emitted from the light emitting side end surface.

In this second embodiment, the first to third waveguides 16 to 18 are disposed stacking with each other, and these waveguides 16 to 18 are coupled with each other by utilizing inclined surfaces which are formed by processing the end surfaces of the respective waveguides so that the light emitted from the first waveguide 16 is incident to the second waveguide 17 and the light emitted from the second waveguide 17 is incident to the third waveguide 18. Therefore, the total of the lengths of the three waveguides 16 to 18 become the light wave guiding distance that is required to make the cross-section intensity distribution uniform. Thus, it is possible to shorten the lengths of the respective waveguides in the light propagation direction as well as to shorten the length of the entire device to a great extent.

Further, since the respective waveguides are optically coupled by utilizing inclined surfaces which are formed at the end portions of the waveguides, it is also possible to reduce the part number, without using prisms which are to be required.

Embodiment 3

Figure 6:
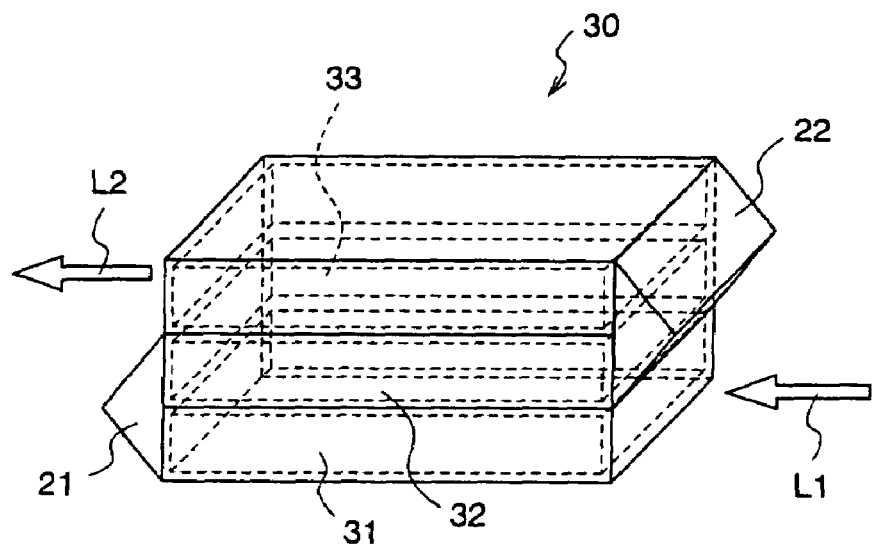
FIG. 6 is a perspective view for illustrating an optical element according to the third embodiment of the present invention.

FIG. 6 is a perspective view illustrating an optical element according to a third embodiment of the present invention.

The optical element 30 of this third embodiment is constituted having first to third waveguides 31 to 33 having rectangular configurations comprising glass material transmitting incident light, and optical coupling parts 21, 22 coupling the respective waveguides 31 to 33 optically serially.

In this optical element 30, second and third waveguides 32 and 33 are successively stacked on the first waveguide 31 so that the light propagation directions in theses waveguides are parallel to each other, and the first waveguide 31 and the second waveguide 32, and the second waveguide 32 and the third waveguide 33 are respectively optically coupled by a rectangular prism 21 which serves as an optical path coupling part and a rectangular prism 22 which serves as an optical path coupling part, respectively.

In this third embodiment, the respective waveguides 31 to 33 are constituted by hollow structure cells comprising material which is transparent at a visible light region, respectively, and either of gas or liquid and Brownian particles are sealed in the respective waveguides.

Functions and effects will be described.

The optical element constituted as above has a compact structure and can convert the incident laser light into a light having uniform cross-sectional light intensity distribution, and further can remove speckle noises which is specific to the laser light source.

A description is detailed below.

As discussed above, speckle noises are generated when laser light of high coherency is employed and the mutual interferences of scattered lights which are reflected at respective portions of convexo-concave at the surface of the screen are their causes. There is a method of vibrating the screen or a method of passing through a scattering plate as conventional methods of reducing speckle noises which are generally known. These methods give to the laser light random phases as temporarily and spatially thereby to arise spatial and temporal variations in the speckle patterns, thereby reducing speckle patterns observed.

In this point, it is thought effective to make the waveguide constituting an optical element as a hollow cell structure and disturb the phase of the laser light in the inside the waveguide. Further, the inventors have found that, noticing the Brownian particles in gas or liquid, the Brownian particles have similar phase disturbing functions.

The Brownian particles mean particles which perform Brownian motion, that is, which behaves irregularly and at random by that gas or liquid serving as solvent, collide to those from various directions and in various speeds, and the briskness of the movements depend on the sizes of Brownian particles, temperatures, and viscosity of solvents.

For example, when the temperature is raised, the thermal movement of molecules constituting the solvents becomes active. Accordingly, by the rise of the temperature, the solvent molecules vigorously move, and accompanying therewith, the Brownian particles become active in their movements. In other words, when the solvent molecules collide with Brownian particles with being rushed, the amount of the Brownian particles being moved becomes large. Therefore, as the temperature is high, the Brownian movement becomes active.

Further, when the size of the Brownian particles is increased, the mass thereof is also increased. Thereby, the amount of the Brownian particles being moved by the solvent molecules are decreased. Further, by that the surface area of the Brownian particles is increased, a lot of particle solvent molecules are collided with each other from various directions, and their forces are cancelled with each other, thereby the forces which the Brownian particles receive is decreased. From these two reasons, when the Brownian particles are large, the Brownian movement becomes not likely occur.

In this third embodiment, as the Brownian particles, latex particles which are colloid particles (polystylene standard particles, its particle diameter is about 1 μm) is employed.

Colloid generally means a nature that is presented by particles of a size of $10^{-9}$ m to $10^{-6}$ m, and it is divided into gel for which the dispersion medium of the colloid particles is solid, sol for which the dispersion medium is liquid, and aerosol for which the dispersion medium is gas. While any of these colloids present Brownian movement, it is preferable that sol for which the dispersion medium is liquid is used. In order to reduce speckle noises, colloid particles which have sizes which can disperse the transmitting light is required. To that end, those which have particle diameter of about 1 μm described above is used in this third embodiment.

Particularly, in order to employ the optical element of the present invention in the visible light region, the colloid particles are preferred to be transparent in the use wavelength region. While almost all of the colloid particles are opaque to the visible light, it is possible to adjust the light transmittance and the speckle noise reduction effect by utilizing such as diluted colloid solution by controlling the colloid concentration.

Speckle noises which are observed when latex solution that is obtained by the above latex particles are dispersed in water which is filling material (solvent) is hermetically sealed in a cell structure waveguide, as laser light is irradiated thereto when it reached a settling equilibrium, and the emitted light from the waveguide is projected onto the screen are compared with speckle noises which are observed when a waveguide which comprises glass material and which is not a hollow shape is used.

In the optical element which comprises a hollow structure waveguide filled with latex solution, the phase of the laser light transmitting through the waveguide is disturbed temporary and spatially by the latex particles which conduct Brownian movement, in addition to that they are subjected to the above-described function of making the emitted light intensity distribution uniform, and the speckle noises are reduced to a great extent with relative to a case where such as a waveguide which comprises glass material and is not of a hollow shape is used.

Besides, when latex particles of about 0.8 μm particle diameter are used, the particle distribution and the Brownian movement of particles become intensive because the particles are light, and the speckle noises are more effectively reduced. On the contrary, when latex particles of larger particle diameter (of about 3 μm particle diameter) are used, the scattering of light become large, but the Brownian movement becomes moderate, and as a total, the effect of reducing speckle noises is reduced. However, when the temperature of the latex solution is held above 60° C., the Brownian movement becomes intensive and the effect of reducing the speckle noises becomes effective.

Since the optical element 30 according to the third embodiment of the present invention is provided with a plurality of waveguides 31 to 33 having hollow structures and optical path coupling parts 21, 22 which optically serially couple the waveguides, and has hermetically sealed either of gas and liquid and Brownian particles, it has a compact structure and can convert the incident laser light into an emitted output light having a uniform cross-section light intensity distribution, and therefore, it is possible to reduce speckle noises which are specific to the laser light source itself.

While in the third embodiment three waveguide 31 to 33 are disposed stacking with each other in the waveguide height direction so that the light transmission directions in the waveguides are parallel to each other and these waveguides are serially connected by the optical path coupling parts 21, 22, the number of waveguides or the number of optical path coupling parts, or the lengths or arrangements of the waveguides are not limited to these shown in the above-described third embodiment.

While in the third embodiment rectangular prisms 21, 22 are employed at the light path coupling parts 21, 22, the coupling of the waveguides may be realized by the respective end surfaces of the waveguides being inclined with respect to the light propagation direction as shown in the second embodiment, resulting in the same effects as in the third embodiment.

Embodiment 4

Figure 7A:
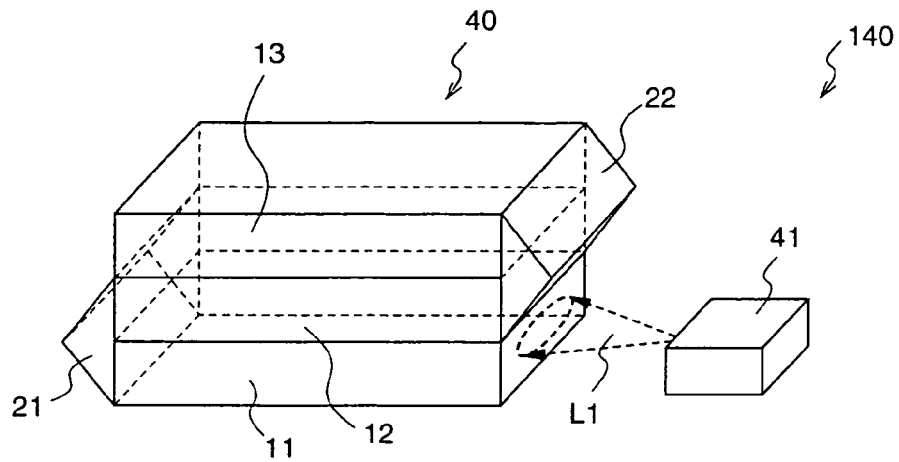
FIG. 7 are a perspective view (FIG. 7(a)) and a cross-sectional view (FIG. 7(b)) illustrating a laser light source according to a fourth embodiment of the present invention.
Figure 7B:
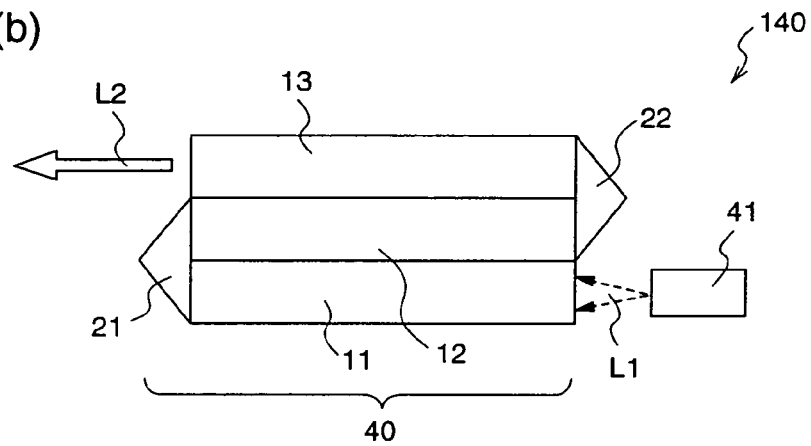

FIG. 7 are diagrams illustrating a laser light source according to a fourth embodiment of the present invention, where FIG. 7(a) is a perspective view and FIG. 7(b) is a side view.

The laser light source 140 of this fourth embodiment has integrated a semiconductor laser 41 with an optical element 40 which converts the laser light emitted from the laser light source 41 to an emitted light having a light intensity distribution that is made uniform. Here, the optical element 40 is the same as the optical element 10 of the first embodiment, and has first to third waveguides 11 to 13 which are disposed stereoscopically stacking with each other and first and second optical path coupling parts 21, 22 which optically serially couples these waveguides.

Next, the function and effect will be described.

At present, among laser light sources which are widely sold out, the smallest general-use laser light source is a semiconductor laser and is used in various apparatuses and in commercial products. As discussed above, the miniaturization and high outputting of a semiconductor laser is advancing and, though the output wavelength is restricted, for example, those which accomplishes a several W class output in a multimode semiconductor device is realized. In order to realize a light source that has made the light intensity distribution uniform by using such miniaturized high output laser, a light source module that has integrated the optical element shown in the first embodiment and a semiconductor laser is effective.

In more detail, in the optical element of this embodiment, when the laser light L1 emitted from the semiconductor laser 41 is incident to the light incident end surface of the first waveguide 11, the incident laser light transmits through the first waveguide 11, the rectangular prism 21, the second waveguide 12, the rectangular prism 22, and the third waveguide 13, and is emitted from the light emitting end surface of the third waveguide 13. When the laser light is transmitted with repeating reflections in the waveguide, the reflected laser lights are mixed. Thereby, the light intensity distribution in an arbitrary plain that is perpendicular to the light propagation direction of the waveguides 11, 12, 13 are gradually made uniform as going far from the light incident end surface in the propagation direction.

Accordingly, by integrating the optical element of the first embodiment and a semiconductor device, it is possible to obtain a laser light having made the cross section light intensity distribution of the emitted light uniform.

As described above, in this fourth embodiment, a semiconductor laser 41 and an optical element having the same construction as in the first embodiment is integrated to constitute a laser light source 140 which converts the laser light emitted from the semiconductor laser 41 into an emitted light having a light intensity distribution that is made uniform to output the same. Therefore, a small sized laser light source having a uniform output light cross-section intensity distribution can be obtained.

Besides, while in the fourth embodiment an optical element constituting a laser light source was the same as that in the first embodiment, the optical element constituting a laser light source may be the same as one shown in FIGS. 4(a) to 4(d), in FIG. 5, or in FIG. 6. For example, when the optical element is the same as one shown in the third embodiment shown in FIG. 6, a small sized laser light source that can remove speckle noises which are specific to the laser light source with keeping the uniform cross-section light intensity distribution can be obtained.

Embodiment 5

Figure 8:
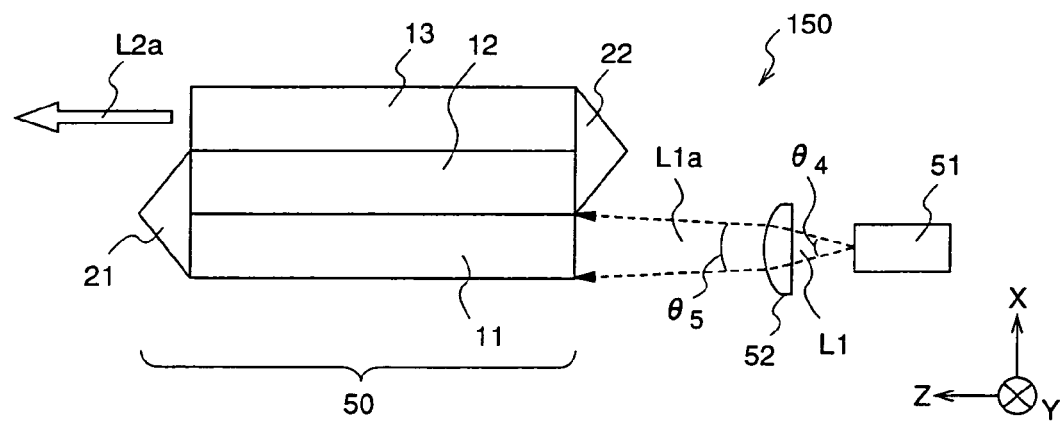
FIG. 8 is a side view illustrating a laser light source according to a fifth embodiment of the present invention.

FIG. 8 is a side view illustrating a laser light source according to a fifth embodiment of the present invention.

The laser light source 150 of this fifth embodiment is constituted by disposing a plano-convex lens on a light path between a semiconductor laser constituting the laser light source of the fourth embodiment and an optical element.

In more detail, the laser light source 150 has a semiconductor laser 51, a plano-convex lens 52 which collects the laser light emitted from the semiconductor laser 51, and an optical element 50 which converts the laser light collected by the plano-convex lens into an emitted light having a uniform light intensity distribution. Here, the semiconductor laser 51 is the same as the semiconductor laser 41 of the fourth embodiment. Further, the optical element 50 is the same as the optical element 10 of the first embodiment, and it has first to third waveguides 11 to 13 disposed stacking in the waveguide height direction and first and second optical path coupling parts 21, 22 which optically and serially connects these waveguides.

Next, functions and effects will be described.

The laser light source of this fifth embodiment is constituted by disposing a plano-convex lens 52 between the semiconductor laser and an optical element constituting a laser light source 140 of the fourth embodiment. Thereby, it is possible to narrow the beam spread angle of the output light from the optical element. This point will be described.

For example, in quite general semiconductor lasers, such as semiconductor lasers comprising semiconductor materials such as AlGaAs series, AlGaInP series, or GaN series, an ellipse shaped beam is emitted based on their structures, and the spread angle of the emitted light is different between in the vertical direction and in the horizontal direction of the beam.

The typical spread angle in a semiconductor laser is 8° to 15° in a narrower one (in the short axis direction of the beam configuration at the emitting end of the semiconductor laser) and 20° to 30° in a wider one (in the long axis direction of the beam configuration at the emitting end of the semiconductor laser).

Accordingly, for example, the emitted light spread angle of the optical element using the waveguides and the optical path coupling parts in this fifth embodiment has a similar size and when it is considered that the emitted light should be utilized, it can be said that those are light beams which are quite difficult to handle.

In order to solve these problems, the inventors of the present invention has examined to try to suppress the spread angle of the light emitted from the optical element by arranging a collective lens on an optical path between the semiconductor laser and the optical element in the laser light source of the fourth embodiment and making the incident light angle to the optical element lesser than the spread angle of the semiconductor laser.

In FIG. 8, references X, Y, and Z designate directions for convenience, where X designates a waveguide width direction, Y designates a waveguide height direction, and Z designates a light propagation direction in the waveguide. In addition, θ4 designates a spread angle in the plain vertical to the Y direction (hereinafter also referred to as X direction spread angle) of the output light from the semiconductor laser, and θ5 designates a spread angle in the plain to the Y direction (hereinafter also referred to as X direction spread angle) of the laser light after passing through the plano-convex lens.

The operation of the laser light source of this fifth embodiment will be briefly described.

In this laser light source 150, the output light from the semiconductor laser 51 transmits through the plano-convex lens 52 and is reduced in its cross-section in X direction and in Y direction, and the laser light L1a which is obtained with the spread angle reduced is incident to the optical element 50. The laser light incident to the optical element 50 transmits through the inside of the waveguide and the optical path coupling part and is outputted from the emitting end surface of the waveguide at the last stage as emitted light L2a.

Here, by appropriately selecting the refractive index and the curvature of the plano-convex lens 52, it is possible to convert to an arbitrary beam spread angle.

Accordingly, for example, it is also possible to make the X direction spread angle θ5 of the laser light L1a that is incident to the optical element 50 below 10° when the X direction spread angle θ4 of the laser light emitted from the semiconductor laser 51 is θ4=30°.

Thereby, it is possible to reduce the X direction spread angle of the laser light L2a emitted after propagating with repeating multiple total reflections in the optical element 50 to about the same as the X direction spread angle of the laser light L1a that is incident to the optical element 50.

Besides, since the plano-convex lens 52 has the same curvatures both in the plain vertical to the X direction and the plain vertical to the Y direction, the laser light spread angle that is incident to the optical element 50 is reduced to the same ratio in each of in the plain vertical to the X direction and in the plain vertical to the Y direction. Further, the incident spread angle of the laser light with respect to the optical element 50 and the internal optical length of the optical element 50 are in a relation of trade-off as shown in formula (1) in the first embodiment, and as the X direction spread angle θ5 of the laser light L1a incident to the optical element 50 is smaller, the waveguide length that is required for making the emitting end surface light intensity distribution of the optical element 50 uniform is increased. Therefore, in the laser light source of this fifth embodiment, it is required to select the X direction spread angle θ5 of the laser light L1a that is incident to the optical element 50 according to its use.

As described above, the laser light source of this fifth embodiment is provided with a semiconductor laser 51, the plano-convex lens 52 which collects the laser light emitted from the semiconductor laser 51, an optical element 50 having the same construction as the optical element of the first embodiment which converts the laser light collected by the plano-convex lens into an emitted light having a uniform light intensity distribution. Thereby, it is possible to obtain a laser light source which can convert the incident laser light into an emitted light having a uniform emitted light cross-section intensity distribution as well as can adjust the spread angle of the emitted light to an arbitrary angle, and which is also compact.

While in the fifth embodiment a plano-convex lens is employed as a collecting lens which collects the emitted light from the semiconductor laser 51 to output to the optical element 50, a both side convex lens may be used for the same in place of the plano-convex lens, with the same effects as described above.

While in the fifth embodiment a lens is arranged on an optical path between the semiconductor laser 51 and the optical element 51 to adjust the spread angle of the emitted light, in place of arranging such lens, the light incident end surface of the optical element 50 may be processed to have a convex plain, a concave plain, or to have a configuration that has different curvatures between in the vertical plain and in the horizontal plain with respect to the incident surface, with the same effects as described above.

Further, in the fifth embodiment, the optical element which converts the incident laser light to an emitted light which has a uniform cross-section intensity distribution has the same construction as that in the first embodiment, the optical element that has the same construction as in the second embodiment may be used. Further, it may be the same as in the third embodiment, and in this case, the effect of removing the speckle noises that is specific to the laser light source can also be obtained.

Embodiment 6

Figure 9A:
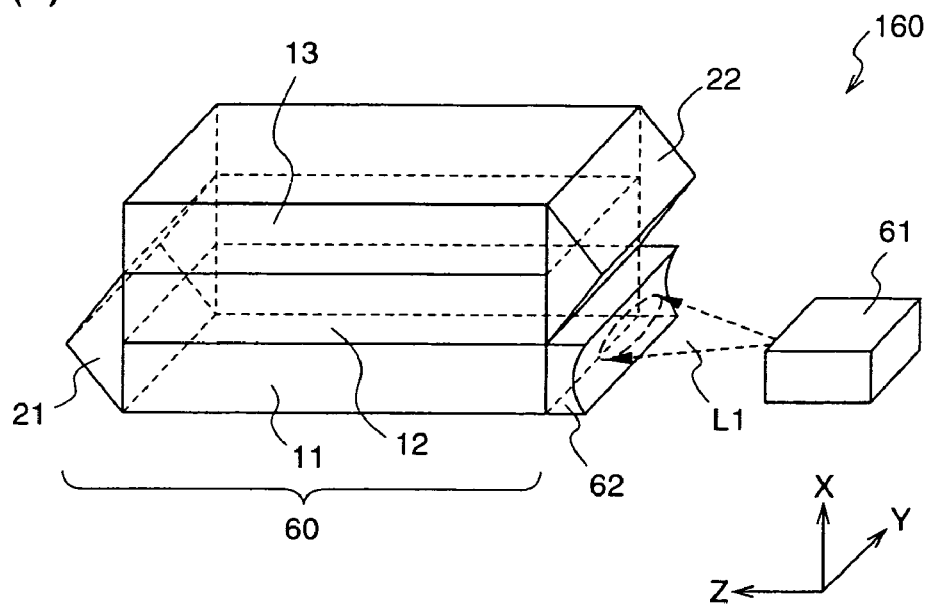
FIG. 9 are a perspective view (FIG. 9(a)) and a cross-sectional view (FIG. 9(b)) illustrating a laser light source according to a sixth embodiment of the present invention.
Figure 9B:
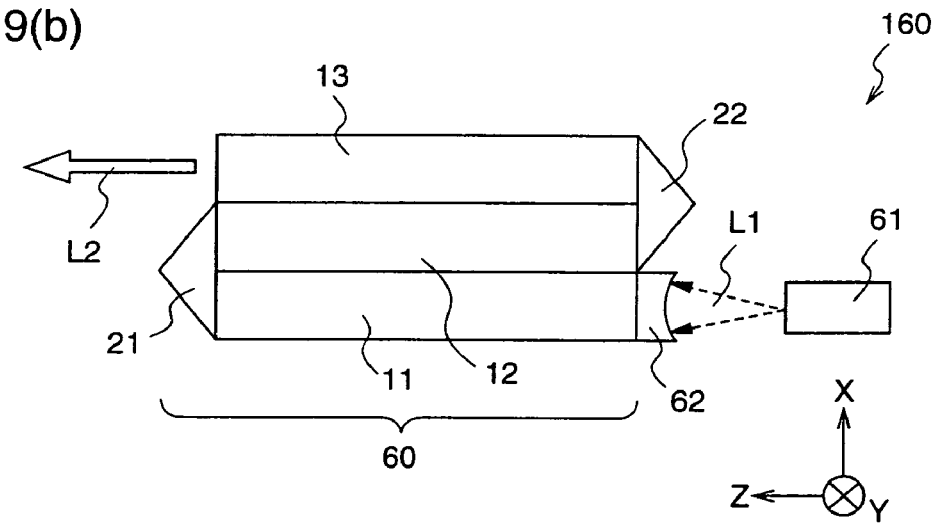

FIG. 9 is a diagram illustrating a laser light source according to a sixth embodiment of the present invention, where FIG. 9(a) is a perspective view and FIG. 9(b) is a side view.

The laser light source 160 of this sixth embodiment has a semiconductor laser 61, a cylindrical lens 62 of a plano-concave lens which changes the spread angle of the laser light emitted from the semiconductor laser 61, and an optical element 60 which converts the laser light which has transmitted the lens 62 to an emitted light having a uniform light intensity distribution. Here, the semiconductor laser 61 is the same as the semiconductor laser 41 in the fourth embodiment. The optical element 60 is the same as the optical element 10 in the first embodiment, and has the first to third waveguides 11 to 13 disposed stacking with each other in the waveguide height direction, and first and second optical path coupling parts 21, 22 which optically couples these waveguides serially. The cylindrical lens 62 is disposed so that its light emitting end surface is adhered to the light incident end surface of the first waveguide 11, and it has a light incident surface which is formed to have a concave configuration curved to form a concave in a plain that is vertical to the width direction of the waveguide (Y direction in the figure). Therefore, in this cylindrical lens 62, the laser light from the semiconductor laser 61 is outputted with the spread angle in the plain vertical to the width direction of the waveguide (Y direction in the figure) enlarged.

Next, functions and effects will be described.

In the laser light source 160 of this sixth embodiment, a cylindrical lens 62 is disposed on an optical path between the semiconductor laser 61 and the optical element 60, and thereby, the optical path in the optical element which makes the cross-section light intensity distribution of the incident light uniform can be shortened as well as the aspect ratio of the emitted light outputted from the optical element 60 can be arbitrarily selected. These points will be described below.

As also described above, in general semiconductor lasers, the aspect ratio and the spread angle of the emitted light are different. Accordingly, the wave-guiding distance that is required to make the cross-sectional intensity distribution uniform in the direction in which in the spread angle is larger, is short, and that distance is required to be made longer in the direction in which the spread angle is small. Here, for example, a cylindrical lens with a concave plain is disposed on an optical path between the semiconductor laser and the optical element, thereby the total optical length in the optical element is made quite short, and the cross-section intensity distribution of the output light is made uniform.

In other words, the laser light L1 emitted from the semiconductor laser 61 is increased only in the spread angle in the plain vertical to the Y direction by the cylindrical lens 62. Therefore, by only increasing the spread angle in the short axis direction of an elliptical shape which is originally possessed by the emitted light from the semiconductor laser 61, it is possible to realize an arbitrary beam aspect ratio (the ratio between the X direction beam spread angle and the Y direction beam spread angle).

Further, since the beam expansion is carried out by the cylindrical lens 62 with a concave plain, the spread angle of the light incident to the optical element 60 is enlarged, and thereby it is possible to shorten the total optical path length of the optical element 60 that is required to make the cross-section light intensity distribution of the emitted light uniform.

Accordingly, even when, for example, the cross-sectional configuration of the waveguide is designed to be in a rectangular shape having an arbitrary aspect ratio, by selecting the curvature of the cylindrical lens 62 according to an aspect ratio of the cross-sectional configuration of the waveguide, a laser light source having an arbitrary beam aspect ratio that can make the output light cross-sectional intensity distribution uniform efficiently with a short optical path length can be accomplished.

As above described, in the laser light source 160 of the sixth embodiment, since the cylindrical lens 62 is disposed on an optical path between the semiconductor laser 61 and the optical element 60, the beam aspect ratio of the laser light incident to the optical element can be made an arbitrary ratio. For example, it is possible to obtain a laser light source 160 which can shape the elliptical beam light emitted from the semiconductor laser into a circular form thereby to obtain a beam that is easy to handle.

Further, even when the cross-sectional configurations of the respective waveguides are designed to be rectangular shapes having arbitrary aspect ratios, the cross-section intensity distribution of emitted light can be made uniform efficiently with a short optical path length by selecting the curvature of the cylindrical lens, and thereby, the degree of freedom in designing configurations of the optical element can be increased.

While the cylindrical lens 62 is disposed on an optical path between the semiconductor laser 61 and the optical element 60 in the laser light source of the sixth embodiment, the end surface of the waveguide may be processed so that the light incident end surface of the optical element 60 has a curvature in place of disposing a cylindrical lens, thereby resulting in the same effects as in the sixth embodiment.

In more detail, while the optical element which makes the cross-section light intensity distribution of the incident laser light uniform is the same as that shown in the first embodiment in the sixth embodiment, the optical element may be the same as that shown in the second embodiment. Further, the optical element may be the same as that shown in the third embodiment, and in this case, it is possible to remove speckle noise which is specific to the laser light source in the light emitted from the laser light source.

Further, while the cylindrical lens with a plain concave configuration is described as an example in the sixth embodiment, the cylindrical lens may have a plain convex configuration. In this case, the light incident to the cylindrical lens reduces an elliptical spread angle in one axis thereby to accomplish a laser light source having an arbitrary output beam aspect ratio, and thereby the design of the configuration of the optical element can be made free.

Embodiment 7

Figure 10:
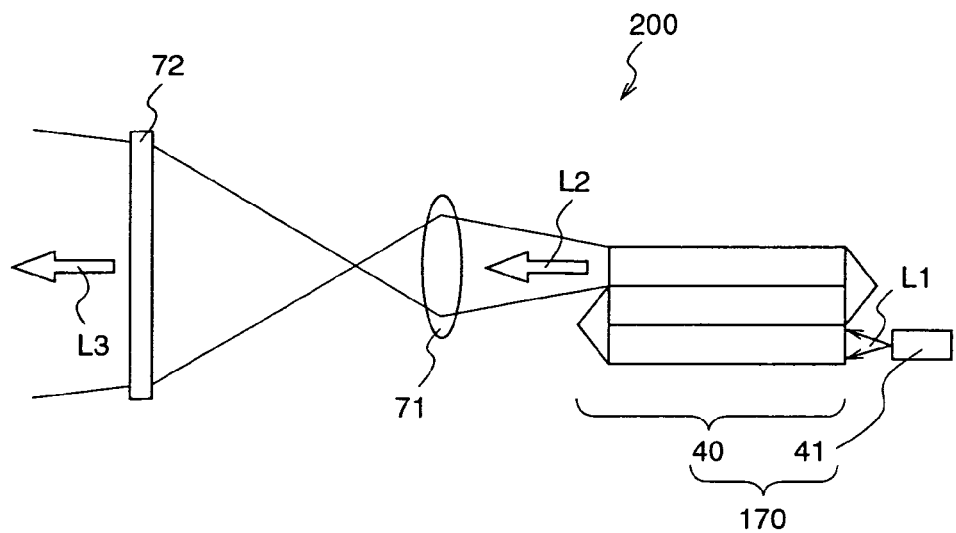
FIG. 10 is a diagram for explaining an illumination apparatus according to a seventh embodiment of the present invention.

FIG. 10 is a diagram illustrating an illumination apparatus 200 according to the seventh embodiment of the present invention.

The illumination apparatus 200 of this seventh embodiment includes the laser light source 170 which outputs a laser light L2, a liquid crystal panel 72 which is a spatial light modulation device, and a collective lens 71 which irradiates the liquid crystal panel 72 with the output light L2 from the laser light source. L3 denotes a laser light after permeating the liquid crystal panel 71. Here, the laser light source 170 is the same as the laser light source 140 of the fourth embodiment shown in FIG. 7.

In the laser light source 170 of this seventh embodiment, as described in the fourth embodiment, the laser L1 which is incident to the optical element 40 from the semiconductor laser 41 is made for its cross-section light intensity distribution uniform while it transmits through the optical element 40, and an output light L2 for its cross-section light intensity distribution made uniform is outputted from the laser light source 170. Further, the laser light L2 which is outputted from the laser light source 170 is projected onto the liquid crystal panel 72 with spreading by the lens 71. At this time, for example, by making the shape of the light emitting end surface in the optical element 40 a similar shape to that of the liquid crystal panel 72, it is possible to effectively irradiate the emitted light L2 to the liquid crystal panel 72 with hardly losing the light amount thereof. The output light L2 irradiated to the liquid crystal panel 72 is modulated by, for example, applying a two-dimensional image signal to a laser light L3 which has an arbitrary intensity distribution, i.e., which is displayed as a two-dimensional image.

By employing such illumination apparatus 200 of this seventh embodiment described above, it is possible to realize displays of various sizes such as a rear projection type display or a head mounting display. Further, it is also possible to project the laser light L3 which has transmitted the space optical modulation device 72 onto such as a screen with spreading the same by employing an appropriate projection optical system.

Embodiment 8

Figure 11:
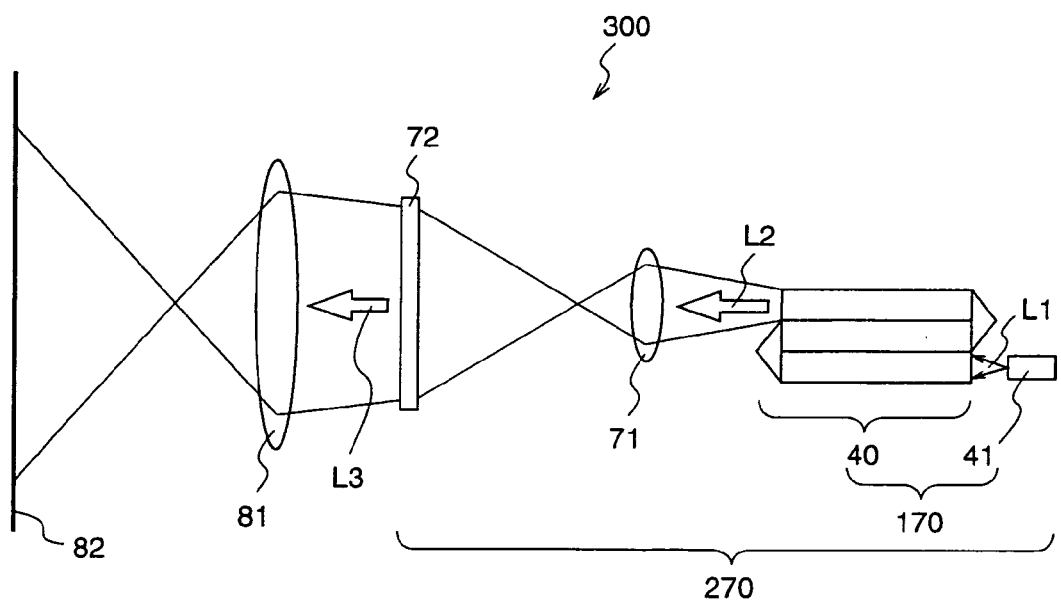
FIG. 11 is a diagram illustrating a two-dimensional image forming apparatus according to an eighth embodiment of the present invention.

FIG. 11 is a diagram illustrating a two-dimensional image forming apparatus according to an eighth embodiment of the present invention.

The two-dimensional image forming apparatus 300 of the eighth embodiment includes an illumination apparatus 270 constituting an illumination optical system, a projection lens 81 which projects the modulated laser light which is outputted from the illumination apparatus 270 with spreading the same, and a screen 82 which receives a light projected from the projection lens 81 to display a two-dimensional image. Here, the illumination apparatus 270 has a construction the same as the illumination apparatus 200 of the seventh embodiment.

In such two-dimensional image forming apparatus 300, the emitted light L2 from the laser light source 170 is collected by the lens 71, and is irradiated to the liquid crystal panel 72 as a space light modulation device in a uniform light intensity distribution as described above. The laser light which is irradiated to the liquid crystal panel 72 is modulated into the laser light L3 having an arbitrary intensity distribution at the liquid crystal panel 72, and is projected with spreading onto the screen 82 by the projector lens 81.

In such two-dimensional image forming apparatus 300 of the eighth embodiment, since an optical element 40 constituting a laser light source 170 is made one having plural waveguides disposed in stereoscopically overlapping to each other and optical coupling parts which serially and optically connects these waveguides, an optical device in which the incident laser light can be converted into an emitted light having a uniform cross-section light intensity distribution as well as which has a small size in the light propagation direction can be obtained, and thereby a spreading projection type two dimensional image forming apparatus such as a laser projector, which enables a small size and 100 inches class projection can be realized.

While in the seventh embodiment and eighth embodiment the laser light source was the same as the laser light source 140 of the fourth embodiment shown in FIG. 7, this laser light source may be the same as the laser light source 150 in the fifth embodiment shown in FIG. 8, or the laser light source 160 in the sixth embodiment shown in FIG. 9.

Further, while in the seventh embodiment and eighth embodiment an optical element constituting a laser light source was the same as that in the first embodiment, the optical element constituting a laser light source may be the same as that shown in any of FIGS. 4(a), 4(b), 4(c), 4(d), 5, and 6.

Further, while in the eighth embodiment a two-dimensional image forming apparatus 300 has a single laser light source, the two dimensional image forming apparatus may have a laser light source corresponding to respective colors of red, blue and green. In this case, as for the laser light sources according to respective colors, the wavelengths of the semiconductor lasers may be selected as wavelengths according to respective colors of red, blue and green, and optical elements constituting respective laser light sources may be constituted by plural waveguides which are disposed stereoscopically stacking with each other and optical path coupling parts which optically serially couples these waveguides, thereby realizing a full color two dimensional image forming apparatus having a laser light source which is small-sized and has its cross-section light intensity distribution of emitted light made uniform.

Further, the illumination apparatus described in the seventh or the eighth embodiment can be applied to a semiconductor exposure equipment which requires a high output power and a uniform illumination by employing a semiconductor laser of ultraviolet radiation wavelength region as a semiconductor laser constituting a laser light source.

APPLICABILITY IN INDUSTRY

The present invention provides an optical element that is compact and that can obtain a laser light having a uniform light intensity distribution, or a laser light source that has integrated a semiconductor laser device and an optical element and has made the emitted light cross-section light intensity distribution uniform. These can be applied to a high output power illumination and a laser assisted processing, and also applicable to an image display apparatus such as a television receiver or an image projector, and an image formation apparatus such as a semiconductor exposure apparatus.

The invention claimed is:

1. A laser light source comprising:
   a semiconductor laser which emits a laser light; and
   an optical element which transmits the laser light,
   said optical element comprising:
      a plurality of waveguides transmitting the laser light; and
      a plurality of light path coupling parts which couple adjacent waveguides and optically couple said plural waveguides serially, the plurality of light path coupling parts comprising:
      a reflection plane which reflects and refracts laser light passing through the waveguides,
   wherein optical path length L from a light input surface of the waveguides to a light output surface of the waveguides satisfies the following equation:

$L \geq W/\tan(\sin^{-1}(\sin(\theta/2)/n))$, wherein W is a width of the waveguide,
   n is a refractive index inside the waveguide, and
   θ is a minimum beam spread angle of the semiconductor laser.

2. The laser light source as defined in claim 1, further comprising:
   a convex lens or a plano-convex lens is located in an optical path between the semiconductor laser and the optical element and makes a spread angle of laser light incident to the optical element smaller than a spread angle of laser light emitted from the semiconductor laser.

3. The laser light source as defined in claim 1, further comprising:
   a cylindrical lens is located in the path between said semiconductor laser and said optical element.

4. The laser light source as defined in claim 3, wherein the cylindrical lens is a plano-concave lens.

5. The laser light source as defined in claim 1, wherein a light incident surface of the optical element is in a curved configuration with a curvature.

6. The laser light source as defined in claim 1, wherein said plurality of waveguides is an odd number of waveguides, and said odd number of waveguides are overlapping with each other in parallel with the light transmission direction of said waveguides.

7. The laser light source as defined in claim 1, wherein external surfaces other than a light input surface and a light output surface of the waveguides and said light path coupling parts are coated with a reflection film reflecting the transmitting light.

8. The laser light source as defined in claim 1, wherein said light path coupling parts comprise inclined surfaces which are inclined with respect to a plane vertical to the light transmission direction and are integrated with said waveguides at one or both ends of adjacent waveguides.

9. The laser light source as defined in claim 1, wherein said waveguides comprise a hollow structure in which gas or liquid, and Brownian particles, are sealed.

10. The laser light source as defined in claim 9, wherein said Brownian particles are colloid particles.

11. A two-dimensional image forming apparatus comprising:
   a laser light source emitting a laser light comprising:
      a plurality of waveguides transmitting a light; and
      a plurality of light path coupling parts which couple adjacent waveguides and optically couple said plurality of waveguides serially, the plurality of light path coupling parts comprising:
         a reflection plane which reflects and refracts laser light passing through the waveguides;
   a space optical modulation part that modulates the laser light emitted from the laser light source; and
   an illumination optical system for illuminating the laser light that is outputted from the laser light source to the space light modulation part, wherein
   an optical path length L from a light input surface of the waveguides to a light output surface of the waveguides satisfies the following equation:

$$L \geq W/\tan(\sin^{-1}(\sin(\theta/2)/n)),$$

wherein W is a width of the waveguide,
   n is a refractive index inside the waveguide, and
   $\theta$ is a minimum beam spread angle of the laser light source.

12. The two-dimensional image forming apparatus as defined in claim 11 further comprising:
   a projection optical system which projects the laser light that is emitted from the space. optical modulation part.

* * * * *

UNITED STATES PATENT AND TRADEMARK OFFICE
CERTIFICATE OF CORRECTION

| | |
|---|---|
| PATENT NO. | : 7,522,792 B2 |
| APPLICATION NO. | : 10/582341 |
| DATED | : April 21, 2009 |
| INVENTOR(S) | : Tomoya Sugita et al. |

It is certified that error appears in the above-identified patent and that said Letters Patent is hereby corrected as shown below:

Column 22, line 52, "wherein optical path" is changed to read --wherein an optical path--;

Column 24, line 27, "space. optical" is changed to read --space optical--.

Signed and Sealed this

Fifteenth Day of December, 2009

David J. Kappos
*Director of the United States Patent and Trademark Office*